Oct. 25, 1927.
J. B. LA PIERRE
STEERING WHEEL
Filed Oct. 20, 1926
1,646,410
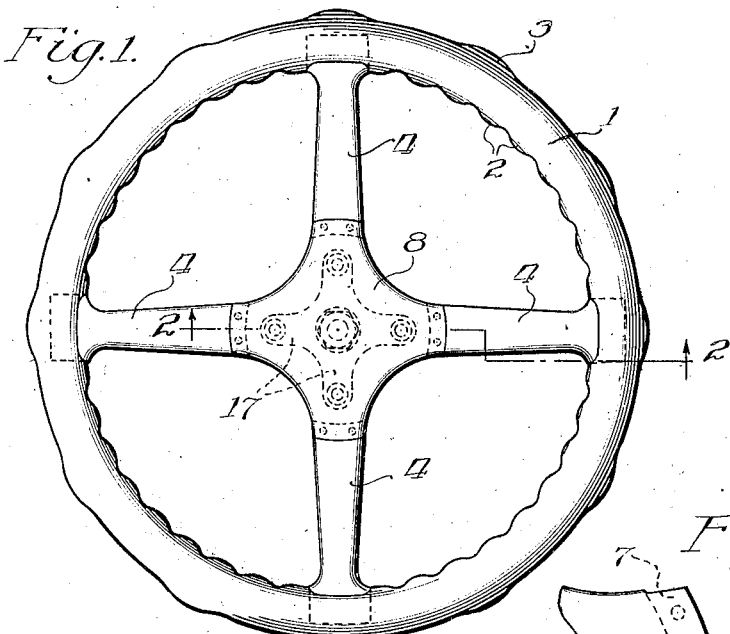
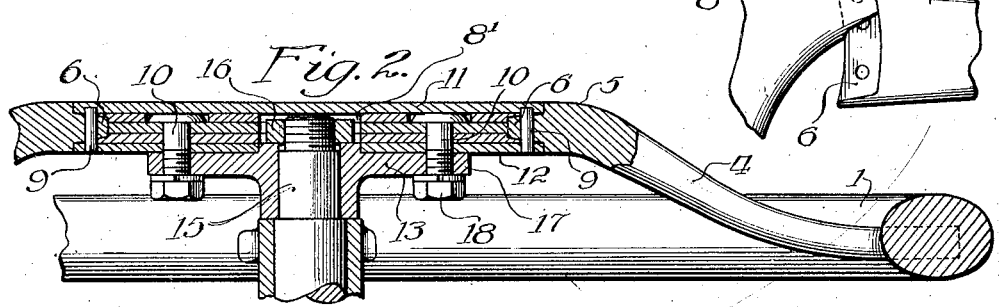
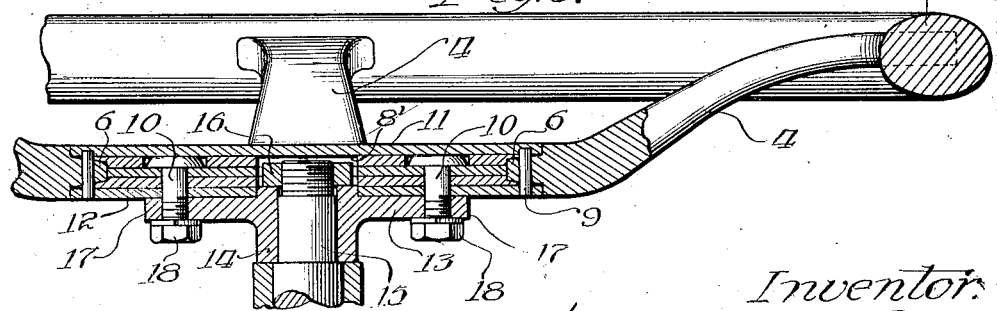

Patented Oct. 25, 1927.

1,646,410

UNITED STATES PATENT OFFICE.

JULIAN B. LA PIERRE, OF CHICAGO, ILLINOIS.

STEERING WHEEL.

Application filed October 20, 1926. Serial No. 142,900.

This invention relates to the manufacture of steering wheels of substantially all wood construction, for use on motor vehicles and the like, and in which the plane of the hub of the steering wheel is offset from the plane of the rim.

The purpose of the construction set forth herein is so that the wheel when assembled with the hub in one position is suitable for types of cars such as a Ford, wherein the plane of the rim of the steering wheel is lower than the hub which is attached to the upper end of the steering column, and, when the hub is assembled in its opposite position and the wheel mounted on the steering column, the plane of the rim will be above the plane of the hub as in practically all automobiles of the larger type. In this way the parts can be manufactured and kept in stock with the hubs separate from the remainder of the wheel and when orders are received for the particular type of wheel wanted, the hub can be quickly assembled to the rim and spider arms in whichever position is desired, depending upon the type of car upon which the steering wheel is to be used.

The main objects of this invention are to provide a wheel of all wood construction that is adaptable to all types of motor cars; to provide a steering wheel in which the usual steering wheel retaining nut is completely concealed; to provide a steering wheel of all wood construction in which the hub can be quickly and securely assembled to the rim and arms; and to provide an article of this kind which will present a smooth and finished appearance and of strong and durable construction.

An illustrative embodiment of this invention is shown in the accompanying drawings, in which:

Figure 1 is a plan view of the improved steering wheel.

Fig. 2 is a section taken on the line 2—2 with the hub assembled to the arms in one of its positions.

Fig. 3 is a section taken on line 2—2 of Fig. 1 with the hub assembled in the opposite position to that shown in Fig. 2.

Fig. 4 is an enlarged detail showing the tongue and groove construction and method of assembling.

In the construction shown in the drawings, the steering wheel comprises a rim 1 of usual construction having suitable knobs 2 on the inner side of the rim for better engaging it with the fingers and similar knobs 3 on the outer periphery for providing hand-holds. Radially disposed spider arms 4 are rigidly mounted at their outer ends by being mortised in the rim 1, and extend inwardly, the arms being bent so that the inner ends 5 are in a plane parallel to and offset from the plane of the rim 1 as shown in Figs. 2 and 3. The inner ends of each of the arms are cut away to provide tongues 6 which fit in complementary grooves 7 formed in a hub 8. Means are provided for securing the complementary overlapping parts of the hub 8 to the arms 4 against relative rotation and comprise dowel pins 9.

The hub 8 is preferably formed of laminated construction and has embedded therein a series of bolts 10, the heads of which are concealed underneath the top layer of lamination so as to be invisible from the top side 11 of the hub, the threaded ends of the bolts projecting a suitable distance beyond the surface of the hub on the base side 12.

For mounting the steering wheel on to the steering column of the motor vehicle, a metal spider 13 is provided which has a hub 14 bored to fit the upstanding end 15 of the steering column and adapted to be secured thereon by a nut 16. Arms 17 on the spider 13 are drilled with holes to register with the bolts 10, and nuts 18 are threaded on the bolts 10 for securing the spider 13 to the base side 12 of the hub 8. The hub 8 has an annular recess 8' extending from the base side 12 thereof as far as the top layer of lamination for receiving the nut 16 and steering column end, said nut being concealed from view by the top layer of lamination.

In the manufacture of this wheel, the rim 1 and arms 4 are made up of standard stock and the laminated hubs 8 are made up and kept separately, the grooves 7 formed in the hub 8 being such that the hub can be assembled when desired with the base of the hub facing towards the plane of the rim or with the top surface 11 of the hub facing toward the plane of the rim. Assembling is accomplished by placing the hub in the same plane as the inner ends of the arms 4 and then rotating the hub relative to the arms, causing the tongues 6 to enter the grooves 7 of the hub as shown in Fig. 4. These coacting, overlapping surfaces are covered with glue prior to being assembled and when in assembled position the dowel pins 9 are driven into their respective holes and provide additional means for securing the parts in interlocked relationship.

Being able to carry these wheels in stock in unassembled condition, it is only necessary to maintain half the amount of stock on hand that would otherwise be necessary if the wheels were completely assembled as has been heretofore done. The metal spiders 13 have various different sizes of bore and length of hub for fitting on steering columns of the different makes of cars.

Although but one specific embodiment of this invention has been herein shown and described, it is to be understood that numerous details of the construction shown may be altered or omitted without departing from the spirit of this invention as defined by the following claims.

I claim:

1. A steering wheel comprising a rim, a plurality of spider arms having their outer ends supported on said rim, and a hub member, said hub member and the inner ends of said arms being provided with complementary overlapping parts adapted to interlock when said hub and arm ends are rotated relative to each other in the same plane.

2. A steering wheel comprising a rim, a plurality of spider arms having their outer ends supported on said rim, and a hub member, said hub member and the inner ends of said arms being provided with complementary tongue and groove parts adapted to engage each other when said hub and arm ends are rotated relative to each other in the same plane.

3. A steering wheel comprising a rim, a plurality of spider arms having their outer ends supported on said rim, the inner ends of said arms being in a plane offset from the plane of said rim, a hub member having a top side and a base side, said hub and the inner ends of said arms being provided with complementary overlapping parts adapted to interlock when said hub and arm ends are rotated relative to each other in the same plane with either the base side or the top side of said hub facing the plane of said rim.

4. A steering wheel comprising a rim, a plurality of spider arms having their outer ends supported on said rim, a hub member, said hub member and the inner ends of said arms being provided with complementary tongue and groove parts adapted to engage each other when said hub and arm ends are rotated relative to each other in the same plane, and dowel pins for securing said hub and arms in engaged relation.

5. The combination in a steering wheel of a rim, a plurality of wooden spider arms attached to said rim, a wooden hub attached to said arms, said hub having a top side and a base side, a metallic spider adapted to be secured on a steering column, and means for attaching said metallic spider to the base side of said wooden hub, said hub having a recess in the base side thereof for receiving the upper end of the steering column, said recess extending only part way through said hub.

6. The combination in a steering wheel of a rim, a plurality of wooden spider arms attached to said rim, a wooden hub of laminated construction attached to said arms, said hub having a top side and a base side, a plurality of headed studs embedded in said hub with the threaded shanks thereof protruding from the base side of said hub, the heads of said studs being concealed under the top side of said hub, a metallic spider adapted to be secured on a steering column, said spider having apertures therein for receiving said studs, and nuts on said studs for securing said spider to the base side of said hub.

7. A steering wheel comprising a wooden rim, a plurality of spider arms having their outer ends mortised in said rim, the inner ends of said arms being in a plane parallel to and off-set from the plane of said rim, a wooden hub member of laminated construction having a top side and a base side, means for attaching said hub to the inner ends of said arms with either the base side or the top side of said hub facing the plane of said rim, and a plurality of headed studs embedded in said hub with their threaded shanks protruding from the base side of said hub, the heads of said studs being concealed under the top side of said hub.

Signed at Chicago this 15th day of October, 1926.

JULIAN B. LA PIERRE.